No. 631,546. Patented Aug. 22, 1899.
G. W. MILLER.
POCKET KNIFE.
(Application filed June 27, 1898.)
(No Model.) 2 Sheets—Sheet 1.
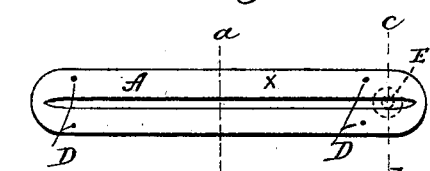
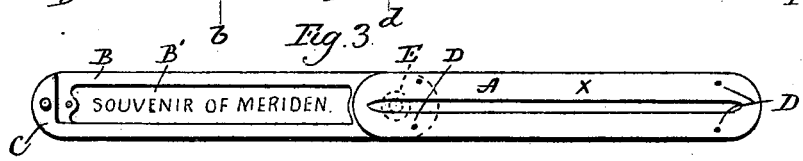
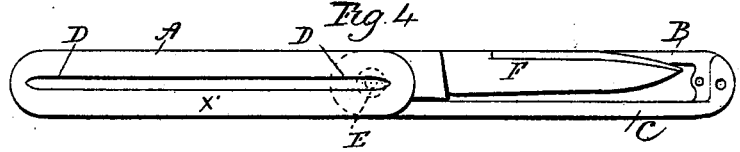
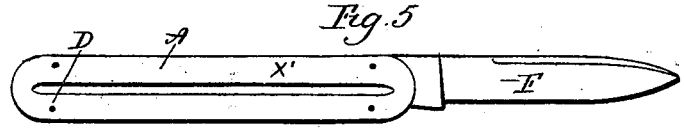
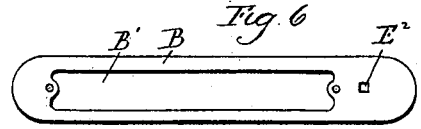
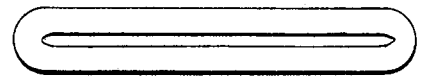
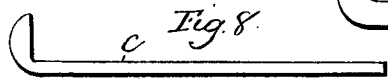
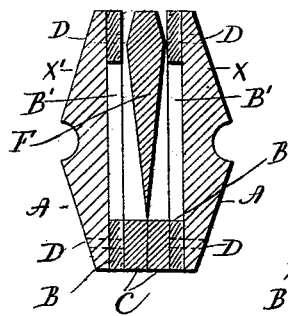
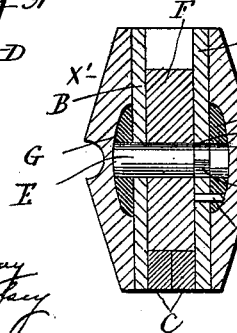
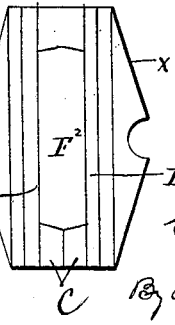
Witnesses
J. H. Shumway
Lillian D. Kelsey
George W. Miller
Inventor
By atty Earl Seymour
THE NORRIS PETERS CO., PHOTO-LITHO., WASHINGTON, D. C.

No. 631,546. Patented Aug. 22, 1899.
G. W. MILLER.
POCKET KNIFE.
(Application filed June 27, 1898.)
(No Model.) 2 Sheets—Sheet 2.
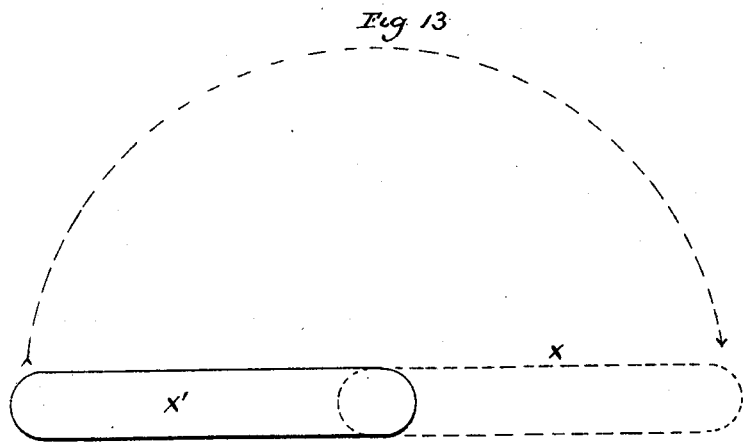
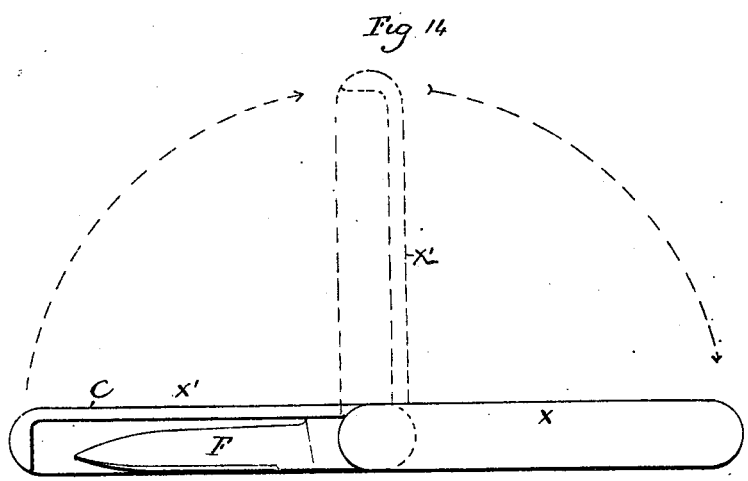
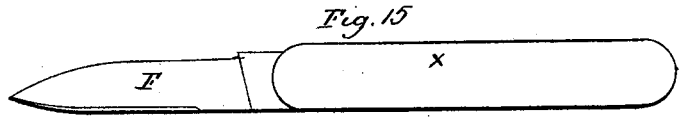
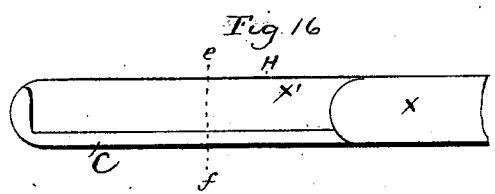
George W. Miller.
Inventor.
By atty. Earle Seymour
THE NORRIS PETERS CO., PHOTO-LITHO., WASHINGTON, D. C.

UNITED STATES PATENT OFFICE.

GEORGE W. MILLER, OF MERIDEN, CONNECTICUT.

POCKET-KNIFE.

SPECIFICATION forming part of Letters Patent No. 631,546, dated August 22, 1899.

Application filed June 27, 1898. Serial No. 684,535. (No model.)

*To all whom it may concern:*

Be it known that I, GEORGE W. MILLER, of Meriden, in the county of New Haven and State of Connecticut, have invented a new Improvement in Pocket-Knives; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a knife constructed in accordance with my invention; Fig. 2, a plan view thereof; Fig. 3, a view of the knife in side elevation with the respective members of its handle extending end to end, so as to show the advertising matter visible upon the inner face of one of them; Fig. 4, a reverse view; Fig. 5, a view of the knife in side elevation as it appears when open; Fig. 6, a detached plan view of one of the lining-plates of the knife-handle; Fig. 7, a similar view of one of the cover-plates of the knife-handle; Fig. 8, a similar view of one of the knife-springs; Fig. 9, a similar view of the knife-blade; Fig. 10, an enlarged view, in transverse section, of the knife on the line $a\,b$ of Fig. 1; Fig. 11, a corresponding view on the line $c\,d$ of Fig. 1; Fig. 12, an end view of the knife, on the same scale, looking at the tang of the knife-blade and at the ends of the two springs which coact with the tang of the blade; Fig. 13, a view in the nature of a diagram showing the mode of opening the knife; Fig. 14, a similar view showing the next step in the opening of the knife; Fig. 15, a view showing the knife as opened in the manner illustrated by Figs. 13 and 14; Fig. 16, a view showing one of the modified forms of incorporating advertising material in the two members of the knife-handle; Fig. 17, a sectional view on the line $e\,f$ of Fig. 16.

My invention relates to an improvement in pocket-knives, the object being to produce a simple, novel, attractive, and convenient knife constructed with particular reference to the utilization of its handle for advertising purposes in such a way that the advertising matter shall ordinarily be concealed from view as well as protected against disfigurement.

With these ends in view my invention consists in a knife having its handle composed of two independently-formed members which are connected only by the pivot on which the knife-blade turns, whereby the said handle members may be swung away from each other so as to expose their inner faces, where the advertising matter, of whatever description, is in some manner displayed.

My invention further consists in certain details of construction and combinations of parts, as will be hereinafter described, and pointed out in the claims.

In carrying out my invention as herein shown the handle of the knife is composed of two independent handle members, which are independent of each other in the sense that they are not secured together in the ordinary way. Each of these handle members consists of a cover-plate A, which may be of any desired material—such as metal, rubber, horn, celluloid, or bone—a lining-plate B, which will preferably be made of sheet-steel, and a spring C, the said cover-plate, lining-plate, and spring of each handle member being secured together in any approved manner—such, for instance, as by rivets D. Two handle members thus constructed may be said to be organized independently of each other and are connected together only through the medium of the pivot E, on which the knife-blade F swings, and which passes through a hole F', formed in the tang $F^2$ of the blade. For convenience of description I shall now designate the respective handle members by the letters X and X', applied in addition to the letters employed to designate their component parts. The projecting ends of the pivot E are headed down in the washers G and G', respectively applied to the outer faces of the lining-plates B of the two handle members, as clearly shown in Fig. 11. In order to prevent the said pivot from turning on its longitudinal axis, it is rigidly connected with one of the two handle members, while the other is left free to turn upon it. As herein shown, the pivot E is rigidly connected with the handle member X. With this end in view the rivet is formed with a squared portion E, which passes through a square hole $E^2$, formed in the lining-plate B of the handle member X, as plainly shown in Fig. 6. Under this construction the rivet is prevented from turning with respect to the lining-plate B of the handle member X, and therefore with respect to any portion of the said member. To reinforce this connection, the washer G is held against rotation by a rivet $G^2$ entering the lining-plate B of the handle member X, as shown in Fig. 11. By thus providing against the rotation of the knife-blade pivot on its longitudinal axis the alinement of the handle members when the knife is closed is preserved.

To open the knife, one of its handle members is swung around through an arc of one hundred and ninety degrees, so as to reverse it end for end with respect to the knife-blade and the other handle members. Then the other handle member is swung around through an arc of one hundred and ninety degrees, so as to reverse it end for end and return it to its original relation to the other handle member, leaving the blade entirely exposed and ready for use. This piecemeal mode of opening the knife by swinging one half of the knife-handle away from the blade and then following it with the other half of the handle, which is thus reversed end for end with respect to the blade, is illustrated by Figs. 13, 14, and 15 of the drawings. In Fig. 13 the knife is shown as closed by full lines, while the movement of the knife member X through an arc of one hundred and ninety degrees, so as to reverse it end for end with respect to the knife member X', is shown by broken lines. In Fig. 14 the two knife members and the blade are shown by full lines; but the knife member X' is shown by broken lines midway of its movement around to join its fellow. In Fig. 15 the knife is shown open as the result of swinging its two handle members around so as to reverse them end for end, as illustrated in the two preceding figures. My improved knife is not therefore opened by engaging the thumb-nail with the blade and extracting the same against the tension of its spring from its normal position in the knife-handle, but rather by moving the two members of the knife-handle, one after the other, away from the blade, so as to leave the same exposed and in a position corresponding to the open position of the blade of an ordinary knife. Now, in order that the blade shall not follow the handle member X' when the same is being swung around into alinement with the previously-moved handle member X, it is necessary that the two springs C C, which bear upon the knife-blade, shall to a certain extent act against each other. With this end in view I differentiate the corners of the tang, the inner corner $f$ of the tang being made lower or rounder than the outer corner $f'$ thereof. This differentiation in the corners of the tang correspondingly differentiates the action of the springs, for it is apparent that less power is required to move the rounded corner $f$ of the tang against the power of either spring than to move the sharper corner $f'$ of the tang against the power of either spring. Now, inasmuch as when either of the two handle members is swung away from the knife-blade and the other handle member the spring of the handle member so moved is only compelled to ride over the rounded inner corner $f$ of the tang of the blade, the same will not follow the handle member being moved, but will be held in its normal position with respect to the other handle member by the spring thereof, for the reason that the said spring last mentioned is in engagement with the sharper outer corner $f'$ of the tang of the blade, and hence requires more power to be sprung than the other spring and in consequence restrains the blade and prevents it from following the handle member being swung into its open position. In order that the springs of the knife may not get out of place as the handle members are operated, the edge of the end of the tang is beveled or crowned, as shown in Fig. 12, and the coacting edges of the springs correspondingly beveled, as also shown in the same figure, so that they will tend to ride away from the center of the tang, and therefore keep their own positions and not interfere with each other.

With reference now to the advertising feature of my improved knife, I may provide for the displaying of advertising material in a variety of ways. In the construction shown by Figs. 1 to 15, inclusive, of the drawings I cut away the central portions of the lining-plates of the handle members to form sight-openings B' therein, as best shown in Figs. 3, 6, and 10. These openings expose portions of the flat inner faces of the cover-plates A of the handle members, and upon the cover-plate surfaces so exposed I propose to place advertising matter, as shown in Fig. 2. Thus if the cover-plates are made of rubber, as they may be and very likely in most cases will be, I propose to print the desired advertising material directly upon the rubber, which, as is well known, takes printing effectively. The advertising material may be in the form of two or three bold words or characters; but there is room enough to have it take the form of three or four closely-written lines, if preferred. Instead of cutting away the lining-plates, as described, to expose portions of the inner faces of the cover-plates, I may etch or otherwise apply advertising matter directly to the inner faces of the lining-plates, as shown in Figs. 16 and 17, in which the lining-plates H are seen to be left solid as distinguished from the plates B, which are centrally cut away. It will be seen that in either of these two constructions the knife will present the exterior appearance of an ordinary knife and that its advertising matter is only brought to light when the knife is open. The advertising matter is thus protected against disfigurement, and the knife, moreover, is given novel character and interest. I may say here, however, that it is not essential that the knife be provided with advertising material, which may be omitted, if desired, for without the advertising material the knife has the merit of convenience in use, as it does not require the use of the thumb-nail in opening it; also, without the advertising material it has the merit of being attractive on account of its novelty.

In view of the modifications suggested and of others which may be obviously made I hold myself at liberty to make such changes as fairly fall within the spirit and scope of my invention.

Having fully described my invention, what I claim as new, and desire to secure by Letters Patent, is—

1. A knife having two independent handle members each comprising a cover-plate and a lining-plate and connected together only by the pivot which passes through the tang of the knife-blade.

2. A knife having two corresponding independent handle members each comprising a cover-plate, a lining-plate and a spring, and connected together only by the pivot which passes through the tang of the knife-blade.

3. A knife having two independent handle members each comprising a cover-plate, a lining-plate and a spring, and a pivot passing through the said handle members and through the tang of the blade, and held against turning on its longitudinal axis by being rigidly connected with one of the said handle members for which it forms the only connection.

4. In a knife, the combination with two independent handle members, each provided with a spring, of a knife-blade adapted to be inclosed between the said handle members and having the inner corners of its tang made lower or rounder than the outer corner thereof, and a pivot passing through the tang of the knife-blade, and also through the handle members, which are not otherwise connected together, the action of the springs upon the corners of the tang preventing the knife-blade from following either of the knife members as they are swung away from the edge of the blade in opening the knife.

5. In a knife, the combination with two independent handle members, each of which is provided with a spring, of a blade adapted to be inclosed between the said handle members and having the edge of the end of its tang beveled in opposite directions or crowned to coact with the said springs, which are correspondingly beveled, and thus prevented from displacement, and a pivot passing through the tang of the blade and through the two handle members which are otherwise unconnected.

In testimony whereof I have signed this specification in the presence of two subscribing witnesses.

GEORGE W. MILLER.

Witnesses:
LILLIAN D. KELSEY,
GEORGE D. SEYMOUR.